(12) United States Patent
Lanza et al.

(10) Patent No.: US 10,412,794 B2
(45) Date of Patent: *Sep. 10, 2019

(54) MICROWAVE HEATING DEVICE AND METHOD FOR OPERATING A MICROWAVE HEATING DEVICE

(71) Applicant: ILLINOIS TOOL WORKS, INC., Glenview, IL (US)

(72) Inventors: Nicola Lanza, Chioggia (IT); Chiara DeMassari, Costermano (IT); Francesco Gambato, San Giorgio in Bosco (IT); Michele Sclocchi, San Donato Milanese (IT); Andrea Baccara, Chicago, IL (US); Benoît Flipot, La Bazouge des Alleux (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/438,966

(22) Filed: Feb. 22, 2017

(65) Prior Publication Data

US 2017/0265255 A1 Sep. 14, 2017

Related U.S. Application Data

(60) Provisional application No. 62/306,931, filed on Mar. 11, 2016.

(51) Int. Cl.
*H05B 6/64* (2006.01)
*B65D 81/34* (2006.01)
(Continued)

(52) U.S. Cl.
CPC .......... *H05B 6/6447* (2013.01); *H05B 6/664* (2013.01); *H05B 6/686* (2013.01); *H05B 6/70* (2013.01);
(Continued)

(58) Field of Classification Search
CPC ........ H05B 6/6447; H05B 6/664; H05B 6/70; H05B 6/686; H05B 2206/044;
(Continued)

(56) References Cited

U.S. PATENT DOCUMENTS 4,196,332 A 4/1980 Mackay
6,080,270 A * 6/2000 Tabrez .............. H01J 37/32229
118/723 ME (Continued)

FOREIGN PATENT DOCUMENTS

EP 2326142 A1 5/2011
WO 2011/138675 A2 11/2011

OTHER PUBLICATIONS

International Search Report and Written Opinion of PCT/US2017/021279 dated Jun. 22, 2017, all enclosed pages cited.

(Continued)

*Primary Examiner* — Quang T Van
(74) *Attorney, Agent, or Firm* — Burr Forman McNair (57) ABSTRACT

A microwave heating device includes radiating portions that are adapted to radiate microwaves to the heating chamber and is operated according to operational configurations that differ in frequency and/or in phase shift. A learning procedure is executed in relation with a product positioned in the heating chamber. The learning procedure is executed by changing frequency and phase shift(s) to sequentially operate the radiating portions in a plurality of operational configurations, in such a way that, for each frequency, the radiating portions are operated in a number of operational configurations that differ in phase shift. An energy efficiency is calculated for each of the operational configurations and the obtained data are saved. A heating procedure is executed after the learning procedure. In the heating procedure, the radiating portions are operated according to at least one (Continued)

operational configuration that is selected on the basis of the data obtained in the learning procedure.

20 Claims, 3 Drawing Sheets

(51) Int. Cl.
　　*H05B 6/66* 　　(2006.01)
　　*H05B 6/68* 　　(2006.01)
　　*H05B 6/70* 　　(2006.01)
(52) U.S. Cl.
　　CPC ....... *H05B 2206/044* (2013.01); *Y02B 40/143* (2013.01)
(58) Field of Classification Search
　　CPC ........ H05B 1/0263; H05B 6/705; H05B 6/72; H05B 6/68; Y02B 40/143
　　USPC .............. 219/750, 748, 702, 709, 716, 761; 118/748, 702, 709, 716, 761; 426/87; 156/345, 345.42
　　See application file for complete search history.

(56) References Cited

U.S. PATENT DOCUMENTS

| | | | |
|---|---|---|---|
| 2011/0168699 A1* | 7/2011 | Oomori | H01L 21/67115 219/748 |
| 2012/0103972 A1 | 5/2012 | Okajima | |

OTHER PUBLICATIONS

71(3) Communication from corresponding EP application No. 17712904.6 dated Jul. 25, 2019, all enclosed pages cited.

* cited by examiner

MICROWAVE HEATING DEVICE AND METHOD FOR OPERATING A MICROWAVE HEATING DEVICE

CROSS REFERENCE TO RELATED APPLICATION

This application claims priority to U.S. application No. 62/306,931 filed Mar. 11, 2016, the entire contents of which are hereby incorporated by reference in its entirety.

TECHNICAL FIELD

This disclosure relates in general to the field of electromagnetic heating. Specifically, this disclosure relates to a microwave heating device and a method for operating a microwave heating device, in particular for thawing and/or cooking food products.

BACKGROUND

At present there are many known and widely-used techniques for heating a food product, both for thawing and for cooking.

According to some known heating techniques, the food product receives heat through its outer surface, which exchanges heat with an external heating element or with an external environment which is at a higher temperature. In these techniques, the flow of heat inside the food product is determined by the temperature gradient and by thermal diffusivity of the food product itself.

According to other known heating techniques, heat is generated directly inside the food product by means of electromagnetic fields or electromagnetic radiations. Amongst these, some techniques use radio frequency (RF) dielectric heating and other techniques use microwaves (MW). Conventionally, radio frequency (RF) electromagnetic waves lie within the band of frequencies between 1 and 300 MHz, whilst microwaves (MW) lie within the band of frequencies between 300 MHz and 300 GHz. Generally speaking, radio frequency heating devices and microwave heating devices are known and widely utilized.

Electromagnetic heating techniques that use radio frequency or microwaves are generally useful for achieving shorter thawing or cooking times than techniques that use heat exchange through the surface of the food product. However, a problem common to many known electromagnetic heating techniques relates to the difficulty of performing heating of a specific load of product in a reproducible, efficient manner or complying with other user requirements. That problem normally seems to be more significant for microwave heating devices.

It should be considered that each product has an individual, specific manner to interact with microwaves in a heating chamber of a microwave heating device. Thus, a same operational configuration in terms of frequency and phase shifts of the microwaves may result in efficiency values that are remarkably different from one another when applied to different products to be heated. A similar remark can be made also when spatial uniformity of heating is taken into account. Consequently, when a same operational configuration of the microwave heating device is used for heating different products, it may be found that those products are poorly heated, or overheated or not uniformly heated.

In some prior-art microwave heating devices, cooking recipes are memorized for some product types and can be selected by the user. However, each recipe is based on the behavior of an average product and then its use may result unsatisfactory for an actual load of product.

Moreover, it should be considered that a different positioning of a same product in a microwave heating device may entail a different interaction with microwaves and then a different heating of the product. Therefore, a wrong positioning of the product may reduce the performance of a memorized recipe for that product.

Therefore, it would be desirable to have available a method for operating a heating device, in particular using microwaves, that may be adapted to a specific load of product.

BRIEF SUMMARY OF SOME EXAMPLE EMBODIMENTS OF THE SUBJECT OF THE PRESENT DISCLOSURE

Specifically, this disclosure relates to a device and a method that use a microwave heating technique to heat at least one product. In particular example embodiments, the at least one product is a food product and heating is intended to thaw and/or to cook and/or to merely heat the food product.

In some example embodiments, the microwave heating device may comprise a heating chamber for receiving at least one product to be heated, a microwave generating system including at least two radiating portions adapted to radiate microwaves to the heating chamber, a reflected power detecting system, a control unit. The microwave generating system may generate and radiate, via the at least two radiating portions, respective microwaves having a same frequency and different phases. Therefore, one of the radiating portions may be taken as a reference radiating portion and the microwaves of the other radiating portion (or the other radiating portions) may have respective phase shift (or phase shifts) from the microwave of the reference radiating portion. An operational configuration for the microwave generating system may be defined by the frequency value and the phase shift value (or values).

In some example embodiments, the microwave generating system may comprise four radiating portions. Consequently, each operational configuration may be defined by a frequency value and three phase shift values. The phase combinations of the operational configurations may be represented as points in a three-dimensional space of phase shifts.

The control unit may be designed to operate the microwave generating system and to change the frequency and the phase shift (or phase shifts) of the microwaves radiated by the microwave generating system. Thus, the at least two radiating portions can be operated according to a plurality of operational configurations that differ from one another in frequency and/or in phase shift (or phase shifts) between the radiated microwaves. An energy efficiency, that is inversely related to a ratio of reflected power over radiated power, is associated with each operational configuration. The control unit may be configured to calculate that energy efficiency.

In some example embodiments the control unit may be configured to run a learning procedure, during which, after the at least one product has been positioned inside the heating chamber, frequency and phase shift(s) are changed to sequentially operate the at least two radiating portions in several operational configurations. For each frequency, a number of operational configurations differing in phase shift(s) from one another may be chosen and the at least two radiating portions may be operated in those chosen configurations. The energy efficiency may be calculated for each of said several operational configurations and the obtained data of energy efficiency may be saved.

That is useful for obtaining information about how much a specific load in the heating chamber interacts with microwaves and how such an interaction varies when frequency and/or phase shifts are changed. In particular, the learning procedure may enable mapping of energy efficiency, as a function of frequency and phase shifts, for the specific load of product to be heated. The learning procedure is useful for allowing to best set the operational configurations for heating the specific load of product that is in the heating chamber, e.g., allowing a heating and/or a cooking that is suitable for the type of food, or for implementing the cooking process desired. For example, a uniform cooking or a rapid, efficient cooking may be required for the type of food in the heating chamber.

In other words, data obtained in the learning procedure may be used to select one or more operational configurations for a following heating procedure: during the heating procedure the at least two radiating portions are operated according to at least one operational configuration that has been selected on the basis of the data obtained in the learning procedure. That is useful for adapting the heating procedure to the actual load of product, whose behavior is analyzed in the learning procedure. Thus, the load of product may be heated according to operational configurations that correspond with specific requirements.

To be more specific, during the learning procedure the frequency may be changed over a range and, for each frequency, a number of operational configurations differing in phase shift(s) from one another may be chosen.

According to one possible learning procedure, for each frequency the at least two radiating portions may be sequentially operated in a number of operational configurations with that frequency, before changing the frequency.

According to one possible method of use, the learning procedure may be carried out by operating the microwave generating system with frequency and phase shift(s) that are changed over respective ranges, the energy efficiency being calculated for each of the corresponding operational configurations. That is useful for mapping the energy efficiency over the ranges of interest.

According to another possible method of use, the learning procedure may be carried out by operating the microwave generating system with frequency that is changed over a respective range and, for each frequency, with phase shift values that are randomly generated within respective phase ranges. To be more specific, at least some of the operational configurations for the learning procedure are obtained through random generation of phase shift values. Also in this case the energy efficiency is calculated for each of the corresponding operational configurations. That may be useful for mapping the energy efficiency over the ranges of interest in a faster manner, because the required number of randomized operational configurations may be lower than the number of operational configurations resulting from regular steps over the respective ranges.

In addition to randomly-generated operational configurations, some other operational configurations may be chosen with phase shift values that are at the borders of the respective phase range. That may be useful for ensuring that the entire range of phase shift values is covered by the operational configurations for the learning procedure, even when randomly-generated values are away from the range borders.

The learning procedure for a microwave heating device according to this disclosure may implement an adaptive algorithm: before starting to cook a food product, the behavior of the food product is studied so that it is possible to choose the most suitable type of cooking process without using a standardized process. Each load introduced in the heating chamber has features that differ from other loads, thus the adaptive algorithm allows adaptation of the heating procedure to the specific load, regardless of whether the load has been studied previously.

In particular, the learning procedure may be advantageous in two substantially different ways. A first way provides for mapping the efficiency every time a food product is inserted into the heating chamber, so as to optimally adjust the conditions for a following cooking procedure. That may be useful in businesses where a variety of foods should be heated or cooked. The short duration of the learning procedure does not influence the whole cooking process and the learning procedure may be repeated from time to time without any problem during cooking.

A second way provides for using the learning procedure only for a phase of study and analysis of the system composed of heating device and food product. The learning procedure allows to identify standardized, pre-established recipes, which are suitable for particular types of foods that should be placed in certain fixed positions in the heating chamber. Analyzing the learning results, it is possible to set the heating device in order to cook, with a specific recipe, a pre-studied food just pressing a button associated to that recipe. That may be useful in businesses such as fast food shops, where the range of products to be cooked is very limited and the products are standardized in terms of quantity, shape and size.

BRIEF DESCRIPTION OF THE DRAWINGS

Having herein described the subject of this disclosure in general terms, further features and methods of use will become apparent in the following detailed description of some example embodiments, provided by way of example and without limiting the scope of the disclosure. Reference will be made to the appended figures, which are schematic drawings not necessarily to scale, in which.

DETAILED DESCRIPTION OF EXAMPLE EMBODIMENTS

Figure 1:
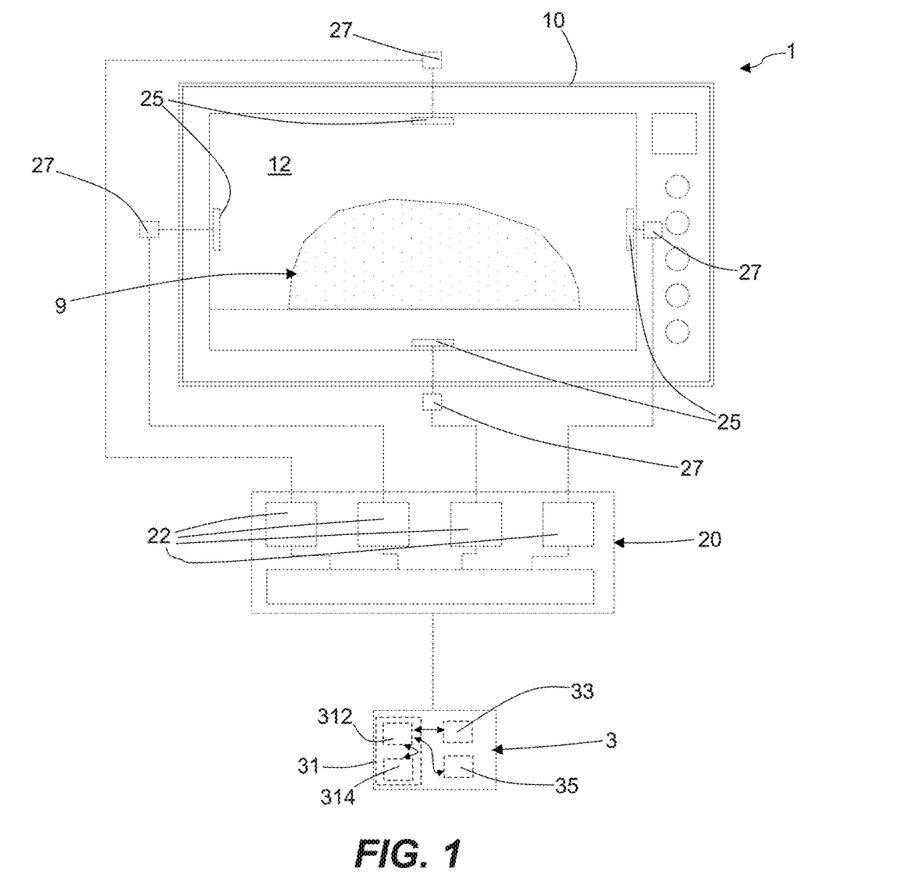
FIG. 1 is a schematic view of an example embodiment of a microwave heating device according to this disclosure, some components thereof being simply depicted as block elements.

An example embodiment of a microwave heating device according to this disclosure is labelled with the numeral 1 and is schematically illustrated in FIG. 1.

FIG. 1 shows several components of the device 1 to make this description easier to understand. Some components in dashed lines are shown outside a structure of the device 1 merely to allow a functional representation thereof. However, the figure should not be taken to be a precise and detailed technical drawing to be used for production purposes. Therefore, FIG. 1 does not show all of the components of the device 1 and shall not be considered to be a drawing in which the scale and proportions between the parts are faithfully reproduced.

The microwave heating device 1 may be used for heating at least one product 9, in particular at least one food product, e.g., a food, a dish, a piece of meat, a vegetable product. According to one mode of use, the microwave heating device 1 may be used for heating a single load or portion of a product 9. According to another mode of use, the microwave heating device 1 may be used for simultaneously heating several loads or portions of a product 9. According to some modes of use, the food product 9 to be heated may be a frozen (or deep-frozen) food product and the device 1 can be used to thaw such a frozen food product 9. According to other modes of use, the device 1 may be used to cook the food product 9.

The device 1 comprises a supporting structure 10, which for example comprises a box-shaped casing and/or a framework that supports the other components of the device 1. The device 1 also comprises a heating chamber 12 which is designed to receive the at least one food product 9 to be heated. For example, the heating chamber 12 is located inside the supporting structure 10. The device 1 may comprise a door (not shown) that may alternatively be opened to allow access to the heating chamber 12 and closed to perform heating of the food product 9 in the closed heating chamber 12.

The device 1 comprises a control unit 3 and a microwave generating system 20 which includes at least two radiating portions 25. In the example embodiment in FIG. 1, the microwave generating system 20 comprises four of said radiating portions 25. In other example embodiments, the radiating portions 25 may be two, three or more than four.

The at least two radiating portions 25 are facing the heating chamber 12. The microwave generating system 20 is designed to generate microwaves and the at least two radiating portions 25 are adapted to radiate microwaves to the heating chamber 12.

In some embodiments, the generation of microwaves is made by solid-state generators. To be more specific, the microwave generating system 20 comprises solid-state power amplifiers 22, each of them being connected with a respective radiating portion 25. The power amplifiers 22 may be controlled independently from one another, for example by the control unit 3, so that the signal generated by each of them may be controlled in terms of frequency, phase and amplitude. The generated signal is received by the respective radiating portion 25 to radiate a corresponding microwave. Thus, the microwaves radiated by the radiating portions 25 can be changed in frequency, phases and/or power.

In some embodiments, the working range for microwave frequency may be between 2400 MHz and 2500 MHz. In other embodiments, the working range for microwave frequency may span the whole band of frequencies between 300 MHz and 300 GHz.

In some embodiments, the working range for microwave phases may be between 0° and 360°. In some embodiments, a maximum value for power provided by each power amplifier 22 may be 200 W. Obviously, lower or higher power values are possible in other example embodiments.

In some embodiments, the microwave generating system 20 may be designed to generate and radiate, via the at least two radiating portions, respective microwaves that have a same frequency and different phases.

In one example embodiment having two radiating portions 25, the two radiated microwaves may have phases that are different from each other. Thus, one radiating portion can be taken as a reference radiating portion and the microwaves radiated by the other radiating portion can have a phase shift from the microwaves radiated by the reference radiating portion.

In other example embodiments having more than two radiating portions 25, the radiated microwaves may have phases that are different from one another. Thus, one radiating portion can be taken as a reference radiating portion and the microwaves radiated by each of the other radiating portions can have a respective phase shift from the microwaves radiated by the reference radiating portion. In the specific example embodiment of FIG. 1 having four radiating portions 25, three phase shifts are defined.

The frequency value and the phase shift value (or values) identify or define an operational configuration of the microwave generating system 20. In other words, an operational configuration is a combination of frequency and phases that the microwave generating system 20 can be operated with. In the specific example embodiment with four radiating portions 25, each operational configuration is defined by a frequency value and three phase shift values.

In addition to the operational configuration defined by frequency and phases, the operative conditions of the microwave generating system 20 include also the power level at which the radiating portions 25 are set.

The control unit 3 may be designed to operate the microwave generating system 20 and to change the frequency and the phase shift(s) of the microwaves generated and radiated by the microwave generating system 20. In other words, the control unit 3 may be designed to set a plurality of operational configurations, according to which the microwave generating system 20 can be operated. Moreover, the control unit 3 may adjust the power level of each radiating portion 25. In particular, the radiating portions 25 may be operated with a same power level, i.e., the microwaves radiated by them may have all a same power.

During use of the microwave heating device 1, a radiated power is associated with the microwaves radiated by the radiating portions 25 and the radiated power is partially absorbed by the to-be-heated food product 9 located inside the heating chamber 12. An absorbed share of the radiated power is converted into heat in the food product 9, whereas a remaining share of the radiated power is reflected by the heating chamber 12.

In some embodiments, the microwave heating device 1 comprises a reflected power detecting system, which is configured to detect the share of radiated power that is reflected by the heating chamber 12. To be more specific, the reflected power detecting system may comprise a plurality of detectors 27, one for each radiating portion 25. Each detector 27 may be adapted to detect the microwave power that is returned to the respective radiating portion 25 by the heating chamber 12.

For example, each detector 27 is an electric-power detector that is positioned between a power amplifier 22 and the respective radiating portion 25. Moreover, radiated power (or forward power) may be detected or measured for each radiating portion 25. For example, the reflected power detecting system and radiated power detectors may be included in electronic circuitry of the microwave heating device 1.

In some embodiments, the control unit 3 may be connected with the reflected power detecting system (and also with the radiated power detectors) and may be configured to calculate an energy efficiency that is inversely related to a ratio of reflected power over radiated power. For example, radiated power ($P_{rad}$) may be calculated as a sum of individual powers radiated by the radiating portions 25; reflected power ($P_{ref}$) may be calculated as a sum of individual reflected powers detected by the detectors 27. Energy efficiency (Eff), in percentage, may be calculated as follows: Eff=$(1-P_{ref}/P_{rad})*100$.

The control unit 3 may be designed to calculate an energy efficiency value for each operational configuration of the microwave generating system 20.

Figure 2:
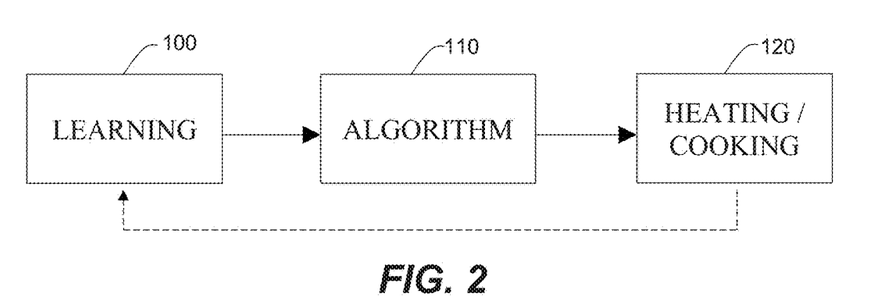
FIG. 2 is a block diagram of a possible method of use for a microwave heating device according to this disclosure.

As schematically shown in FIG. 2, a learning procedure 100, which is intended to "understand" the food product 9, may be executed before a heating procedure 120, which is intended to heat and/or cook the food product 9. An algorithm 110 may be used after the learning procedure 100 and before heating or cooking 120, in order to set the operational conditions of the subsequent heating procedure on the basis of the results obtained in the learning procedure 100. The control unit 3 may be configured to run those procedures.

The learning procedure 100 may have a basic function of evaluating how the food product 9 in the heating chamber 12 interacts with microwaves, in order to allow a favorable setting of the parameters of the microwave generating system 20, that setting being tailored to the specific food product 9. In other words, the learning procedure 100 may be an inspection that aims at testing the food product 9 and identifying the best heating conditions for the food product 9 in the heating chamber 12. It should be noticed that the learning procedure 100 is executed while the to-be-heated food product 9 is inside the heating chamber 12. Therefore, the food product 9 should be positioned in the heating chamber 12 before starting the learning procedure.

Basically, the learning procedure 100 may include applying to the food product 9 microwaves according to a plurality of different operational configurations, by sequentially operating the radiating portions 25 with different phases and different frequencies (but at the same time with the same frequency for all radiating portions 25).

During the learning procedure 100, the control unit 3 may operate the microwave generating system 20 with frequency and phase shift (or shifts) that are changed over respective ranges and the energy efficiency may be calculated for each of the corresponding operational configurations. In other words, a number of configurations are sequentially analyzed and energy efficiency is calculated for each configuration.

The obtained data of energy efficiency for the chosen operational configurations may be electronically saved in order to allow a subsequent processing. In particular, the control unit 3 may be configured to operate the microwave generating system 20 in the chosen operational configurations, to calculate the energy efficiency for each of the chosen operational configurations and to save the obtained data into an electronic data storage.

According to one learning mode, frequency may be changed over a range and, for each frequency, a number of combinations of phases may be chosen over respective ranges. In particular, the control unit 3 is configured to change frequency with a frequency step during the learning procedure. To be more specific, frequency is changed over a range that, for example, is between 2400 MHz and 2500 MHz. For example, the frequency step is 10 MHz. In other embodiments, frequency may be changed over the range between 300 MHz and 300 GHz; the frequency step may be higher (or lower) than 10 MHz According to one specific learning mode, the frequency values may be analyzed one by one and, for each frequency, all the chosen combinations of phases are sequentially adopted before moving on to the next frequency. When an upper (or lower) limit for frequency is reached, i.e., when the frequency value is out of the frequency range, the learning procedure ends.

Figure 3:
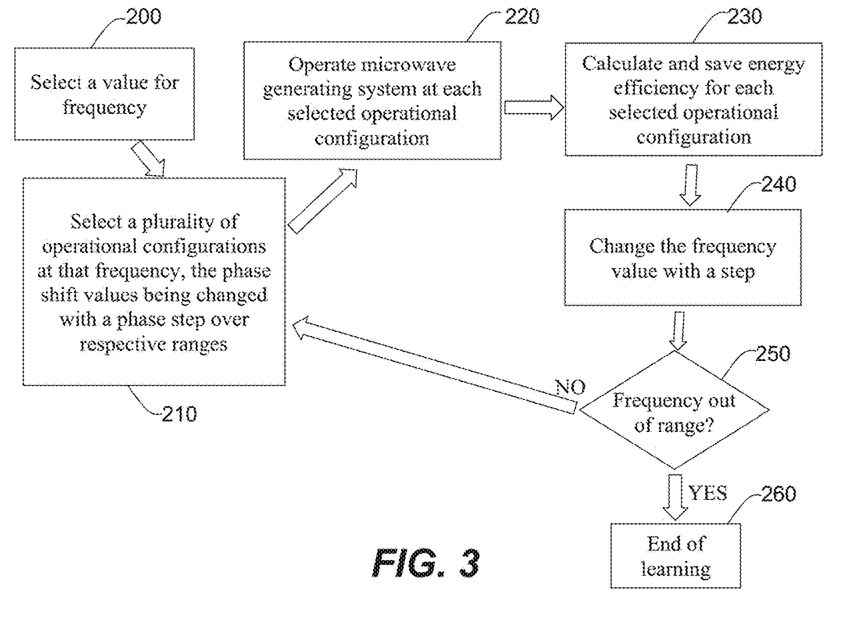
FIG. 3 is a block diagram of a possible learning procedure according to this disclosure.

According to one learning mode, the control unit 3 may be configured to choose the operational configurations by changing phase shift (or shifts) over a respective phase range with a phase step, see the block diagram of FIG. 3. To be more specific, the phase range may be an interval between 0° and 360° and the phase step may be constant over the interval. Thus, the operational configurations may be picked in a predetermined manner, choosing the phase shift values so that the interval 0°-360° is divided into intervals of equal width in order to analyze the same phase combinations for all chosen frequency values. For example, the phase step is 45°.

Considering an embodiment with four radiating portions 25, three phase shift ranges of 0°-360° may be divided using a same phase step. If the phase step is 45°, eight values are considered for each phase shift and the overall number of operational configurations for each frequency is 8×8×8=512. It should be taken into account that a phase shift of 0° is equivalent to a phase shift of 360°, then the corresponding operational configurations are to be considered only once.

Thus, as shown in the example of FIG. 3, a value for frequency may initially be selected at operation 200. A plurality of operational configurations may then be selected at that frequency at operation 210. The phase shift values may be changed with a phase step over respective ranges. Then, at operation 220, the microwave generating system may be operated at each selected operational configuration. Energy efficiency may then be calculated and saved for each selected operational configuration at operation 230. The frequency value may then be changed with a step at operation 240. A determination may then be made as to whether the frequency is out of range at operation 250. If the frequency is out of range, then the learning may end at operation 260. However, if the frequency is not out of range, then flow may return to operation 210.

Figure 4:
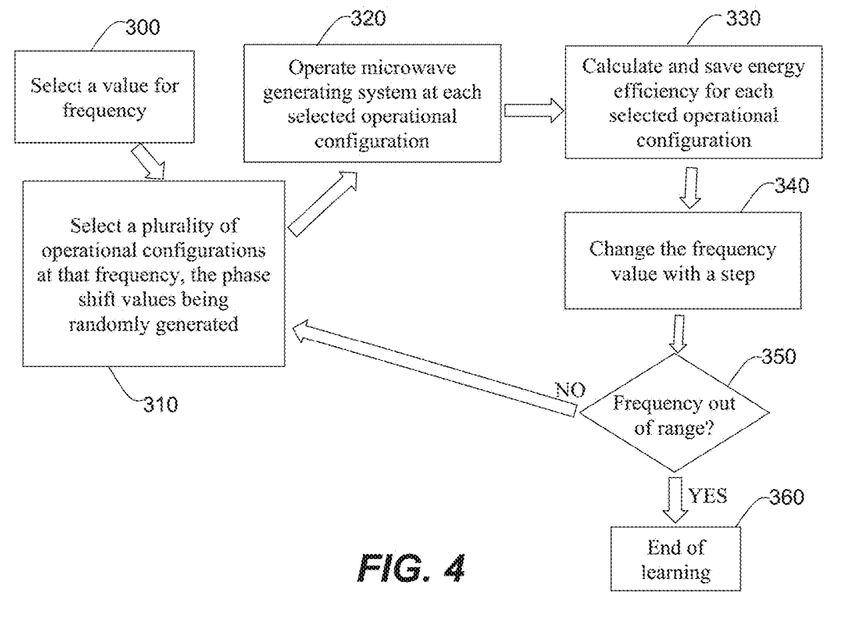
FIG. 4 is a block diagram of another possible learning procedure according to this disclosure.

According to another learning mode, the control unit 3 may be configured to choose at least some of the operational configurations by random generation of phase shift values within a respective phase range, see the block diagram of FIG. 4. Considering an embodiment with four radiating portions 25, each randomized operational configuration may be defined by the current frequency value and three phase shift values that are randomly generated in the range 0°-360°, or alternatively in the range 0°-359°. Thus, the phase combinations of the operational configurations may not be the same for all chosen frequencies.

In order to prevent the operational configurations from being all located in the neighborhood of a single point (as may happen with a pseudo-random generation via computer), the randomized operational configurations may be supplemented with some non-randomized operational configurations, so that the entire range of phase shift values could be covered by the operational configurations chosen for the learning procedure. These non-randomized operational configurations may be chosen with phase shift values that are regularly distributed in the respective phase range, and/or they may be chosen with phase shift values that are at the borders of the respective phase range. For example, considering the embodiment with four radiating portions, phase combinations as (0,0,0), (359,0,0), (359,359,0), (0,359,359), (0,0,359), (359,0,359), (0,359,0), (359,359, 359) may be added.

The step of choosing the operational configurations for learning and the step of operating the microwave generating system in the chosen operational configurations may be sequential steps (i.e., all configurations are chosen by the control unit, then all chosen configurations are sequentially operated) or may be intermingled steps (i.e., a configuration is chosen and operated, then another configuration is chosen and operated, and so on).

Thus, as shown in the example of FIG. 4, a value for frequency may initially be selected at operation 300. A plurality of operational configurations may then be selected at that frequency at operation 310. The phase shift values may be generated randomly. Then, at operation 320, the microwave generating system may be operated at each selected operational configuration. Energy efficiency may then be calculated and saved for each selected operational configuration at operation 330. The frequency value may then be changed with a step at operation 340. A determination may then be made as to whether the frequency is out of range at operation 350. If the frequency is out of range, then the learning may end at operation 360. However, if the frequency is not out of range, then flow may return to operation 310

At the end of the learning procedure, a data matrix containing all the chosen operational configurations and the corresponding energy efficiency values may be obtained and saved.

Figure 5:
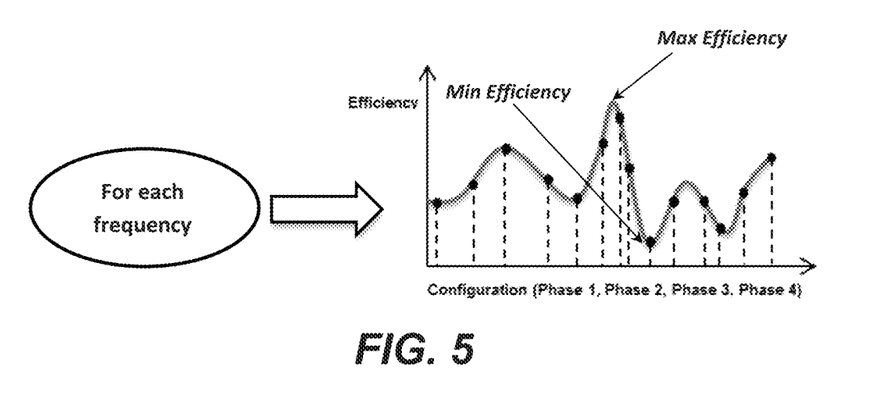
FIGS. 5 and 6 are, respectively, a schematic diagram and an exemplary graph relating to a possible learning procedure for a microwave heating device according to this disclosure.
Figure 6:
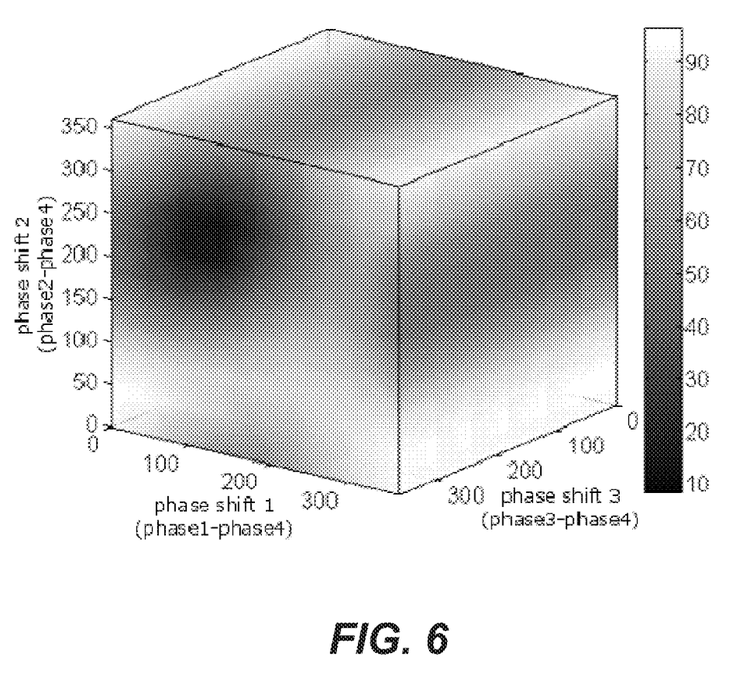

For example, FIG. 5 shows a graph of a trend of energy efficiency depending on configurations, for a same frequency. An analogous graph may be obtained for each frequency value. FIG. 6 shows a hyperspace in which energy efficiency is mapped in greyscale as a function of three phase shifts.

As already mentioned, data obtained in the learning procedure 100 may be processed to select at least one operational configuration to be used in the following heating procedure 120 for the at least one product 9 in the heating chamber 12, the selection being made according to a pre-established criterion. The control unit 3 may be configured to run the selection algorithm 110 for carrying out that data processing. For example, the algorithm 110 may provide for selecting the operational configuration with the maximum energy efficiency or for selecting a number of operational configurations with energy efficiency higher than a threshold value.

The control unit 3 may be configured to run the heating procedure, during which the control unit 3 may operate the microwave generating system 20 in the selected one or more operational configurations. According to the outcome of the algorithm, during the heating procedure the microwave generating system 20 may be operated in a single operational configuration or sequentially in a plurality of operational configurations. According to some modes of use, during the heating procedure each of the selected operational configurations may be applied for a same time, i.e. the overall heating time may be equally divided among the operational configurations.

According to some embodiments, the control unit 3 may be configured to operate the microwave generating system 20 with an adjustable power that is changed between the learning procedure 100 and the heating procedure 120. In particular, the radiated power in the learning procedure 100 is lower than the radiated power in the heating procedure 120. In other words, during the learning procedure 100 the heating chamber 12 may be fed with microwaves having very low power (e.g., an overall power of 20 W), i.e., the power amplifiers 22 may be operated with reduced power (e.g., 5 W each). That may be useful for avoiding a significant heating or cooking of the food product 9 during the learning procedure 100. The learning procedure 100 may last a few seconds, which is a negligible time in comparison with an entire cooking time of several minutes. During the heating procedure 120 the heating chamber 12 may be fed with microwaves having high power, for example the power amplifiers 22 may be operated with power of 200 W.

In other embodiments or modes of use, avoiding a significant heating or cooking during the learning procedure 100 is not an issue. In some cases, for example, heating during the learning procedure 100 may be useful for reducing overall cooking time. Thus, in those cases the learning procedure 100 may be executed with high power as well.

In some methods of use, the heating procedure 120 may be suspended at least one time to repeat the learning procedure 100, so that the heating procedure 120 may be continued with updated operational configurations. In other words, the learning procedure 100 and the heating procedure 120 are alternately repeated more times for the same product 9 in the heating chamber 12, each heating procedure 120 being based on the data obtained in the preceding learning procedure 100. That is useful for adapting the heating procedure 120 to the changing physical characteristics of the food product 9 during heating or cooking.

As already mentioned, the control unit 3 may be configured to run the learning procedure 100, the selection algorithm 110 and the heating procedure 120. In order to carry out those tasks, the control unit 3 may include processing circuitry 31 that may be configured to interface with, control or otherwise coordinate the operations of various components or modules described herein in connection with executing control over such component or modules as described herein. The control unit 3 may utilize the processing circuitry 31 to provide electronic control inputs to one or more functional units of the microwave generating system 20 and/or of the reflected power detecting system, to receive, transmit and/or process data associated with the one or more functional units and perform communications necessary to enable the ability to control operations of the microwave generating system 20 and/or of the reflected power detecting system (or components thereof) as described herein.

In some embodiments, the processing circuitry 31 may be embodied as a chip or chip set. In other words, the processing circuitry 31 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 31 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 31 may include one or more instances of a processor 312 and memory 314 (e.g., volatile or non-volatile memory) that may be in communication with or otherwise control a device interface 33 and a user interface 35. As such, the processing circuitry 31 may be embodied as a circuit chip (e.g., an integrated circuit chip) configured (e.g., with hardware, software or a combination of hardware and software) to perform operations described herein.

The device interface 33 may include one or more interface mechanisms for enabling communication with other devices. In some cases, the device interface 33 may be any means such as a device or circuitry embodied in either hardware, or a combination of hardware and software that is configured to receive and/or transmit data from/to devices or components (e.g., system components) in communication with the processing circuitry 31 via internal and/or external communication mechanisms. Accordingly, for example, the device interface 33 may further include devices and/or means for receiving data from the microwave generating system 20 and/or the reflected power detecting system and/or one or more sensors.

The subject matter of this disclosure may be modified and adapted in several ways without thereby departing from the scope of this disclosure. All details of the invention may be substituted with other technically equivalent elements and the materials used, as well as the shapes and dimensions of the various components, may vary according to requirements. It is therefore evident that the example embodiments described above are non-limiting and that other embodiments are possible, still being covered by the appended claims. Moreover, although the description and the drawings describe examples of combinations of elements and functions, it is evident that embodiments are possible that have different combinations of elements and functions, which in any case are covered by the teaching of this disclosure.

It should also be noticed that the advantages and benefits mentioned with reference to the example embodiments described above do not necessarily have to be present in all of the possible embodiments that are covered by the teaching of this disclosure. The specific terms used in the description are used with a generic and descriptive meaning, not with a limiting purpose.

The invention claimed is:

1. A microwave heating device, comprising:
   a heating chamber which is designed to receive at least one product to be heated;
   a microwave generating system designed to generate microwaves and including at least two radiating portions that are adapted to radiate microwaves to the heating chamber, a radiated power being associated with the radiated microwaves;
   a reflected power detecting system, configured to detect a share of radiated power that is reflected by the heating chamber;
   a control unit;
   the microwave generating system being designed to radiate, via the at least two radiating portions, respective microwaves having a same frequency and different phases, wherein one of the radiating portion can be taken as a reference radiating portion and the microwaves radiated by the other radiating portion(s) can have respective phase shift(s) from the microwaves radiated by the reference radiating portion, the frequency value and the phase shift value(s) defining an operational configuration for the microwave generating system;
   the control unit being configured to operate the microwave generating system and to change the frequency and the phase shift(s) of the microwaves radiated by the microwave generating system;
   the control unit being configured to calculate an energy efficiency that is inversely related to a ratio of reflected power over radiated power;
   the control unit being configured to run a learning procedure in which frequency is changed over a range and, for each frequency, a number of operational configurations differing in phase shift(s) from one another are chosen, the control unit being configured to operate the microwave generating system in the chosen operational configurations and to calculate the energy efficiency for each of the chosen operational configurations; and
   the control unit being configured to save the obtained data of energy efficiency for the chosen operational configurations.

2. The microwave heating device according to claim 1, wherein the control unit is configured to change frequency with a frequency step during the learning procedure.

3. The microwave heating device according to claim 1, wherein the range of frequency is between 300 MHz and 300 GHz, in particular the range of frequency is between 2400 MHz and 2500 MHz.

4. The microwave heating device according to claim 1, wherein the control unit is configured to choose the operational configurations for the learning procedure by changing phase shift(s) over a respective phase range with a phase step.

5. The microwave heating device according to claim 4, wherein the phase range is an interval between 0° and 360° and the phase step is constant over the interval.

6. The microwave heating device according to claim 1, wherein the control unit is configured to choose at least some of the operational configurations for the learning procedure by randomly generating phase shift values within a respective phase range.

7. The microwave heating device according to claim 1, wherein the control unit is configured to run a heating procedure for heating at least one product in the heating chamber, the control unit being configured to process the data obtained in the learning procedure to select at least one operational configuration to be used for the heating procedure.

8. The microwave heating device according to claim 7, wherein the control unit is configured to operate the microwave generating system with an adjustable power, in such a way that the radiated power in the learning procedure is lower than the radiated power in the heating procedure.

9. The microwave heating device according to claim 1, wherein the microwave generating system includes four radiating portions, each operational configuration being defined by a frequency value and three phase shift values.

10. A method for operating a microwave heating device, the microwave heating device comprising a heating chamber and at least two radiating portions that are adapted to radiate microwaves to the heating chamber, wherein the at least two radiating portions can be operated in operational configurations that differ from one another in frequency and/or in phase shift(s) between the radiated microwaves, an energy efficiency being associated with each operational configuration,
   the method including a learning procedure that comprises:
   positioning at least one product in the heating chamber;
   changing frequency and phase shift(s) to sequentially operate the at least two radiating portions in a plurality of operational configurations, in such a way that, for each frequency, the at least two radiating portions are operated in a number of operational configurations that differ in phase shift(s) from one another;
   calculating the energy efficiency for each of said plurality of operational configurations;

saving the obtained data of energy efficiency for said plurality of operational configurations.

11. The method according to claim 10, wherein, for each frequency in the learning procedure, the at least two radiating portions are sequentially operated in a number of operational configurations with that frequency, before changing the frequency.

12. The method according to claim 10, wherein the frequency in the learning procedure is changed over a range with a frequency step.

13. The method according to claim 10, wherein the frequency in the learning procedure is changed between 300 MHz and 300 GHz, in particular between 2400 MHz and 2500 MHz.

14. The method according to claim 10, wherein phase shift(s) in the learning procedure is/are changed over a respective phase range with a phase step.

15. The method according to claim 14, wherein, in the learning procedure, the phase range is an interval between 0° and 360° and the phase step is constant over the interval.

16. The method according to claim 10, wherein at least some of the operational configurations for the learning procedure are obtained by random generation of phase shift values within a respective phase range.

17. The method according to claim 16, wherein some other operational configurations for the learning procedure are chosen with phase shift values that are regularly distributed in the respective phase range and/or are at the borders of the respective phase range, so that the entire phase range is covered by the operational configurations for the learning procedure.

18. The method according to claim 10, including a heating procedure that follows the learning procedure, such that in the heating procedure the at least two radiating portions are operated in at least one operational configuration that is selected on the basis of the data obtained in the learning procedure.

19. The method according to claim 18, wherein power of the microwaves radiated in the learning procedure is lower than power of the microwaves radiated in the heating procedure.

20. The method according to claim 18, wherein the learning procedure and the heating procedure are alternately repeated more times for the same at least one product in the heating chamber, each heating procedure being based on the data obtained in the preceding learning procedure.

* * * * *